May 10, 1966
L. F. HIMMELMAN
3,250,889
ELECTRIC WELDING TORCH
Filed May 21, 1964
2 Sheets-Sheet 1
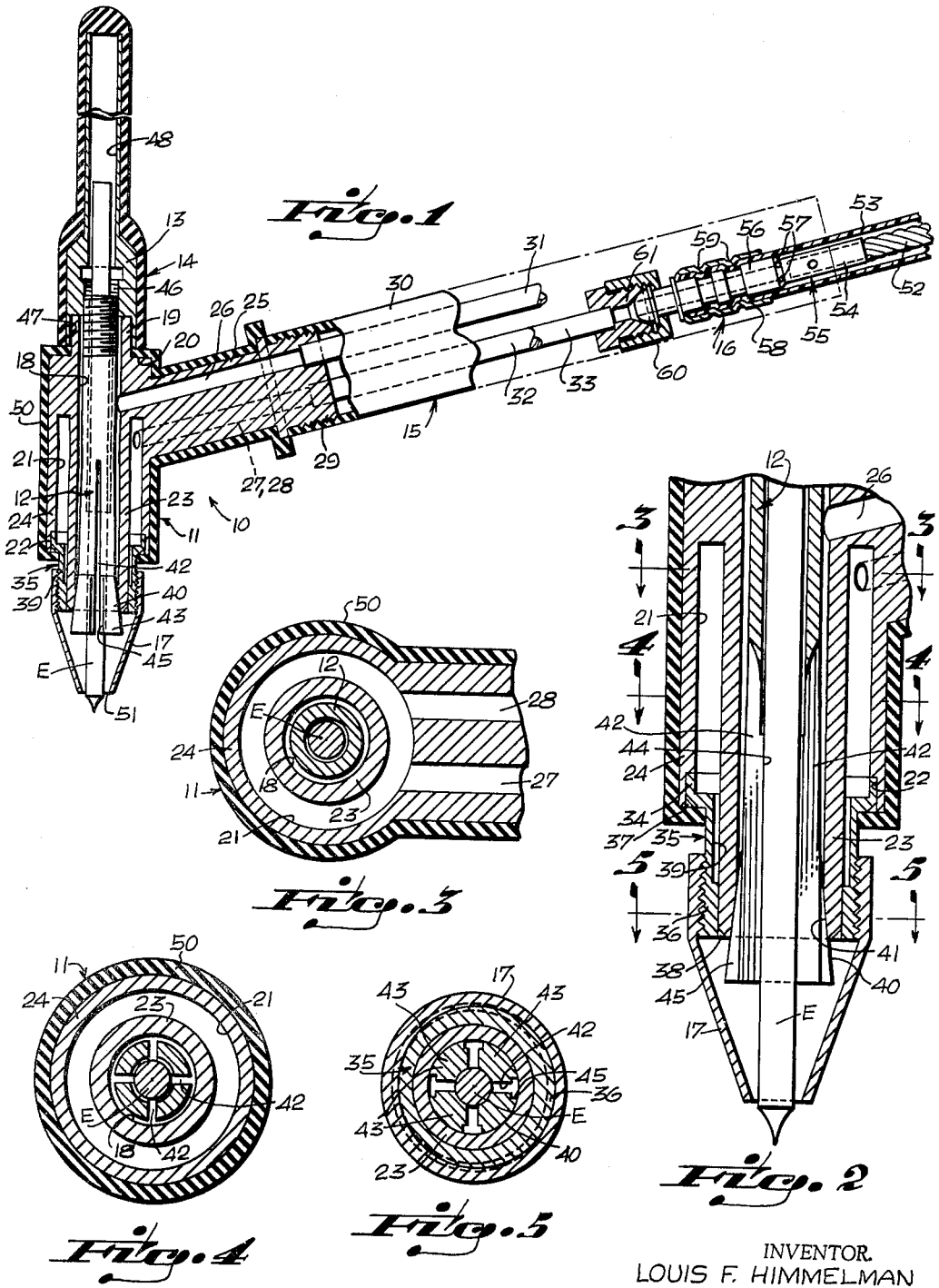
INVENTOR.
LOUIS F. HIMMELMAN
BY James J. Cannon
ATTORNEY.

May 10, 1966  L. F. HIMMELMAN  3,250,889
ELECTRIC WELDING TORCH
Filed May 21, 1964  2 Sheets-Sheet 2
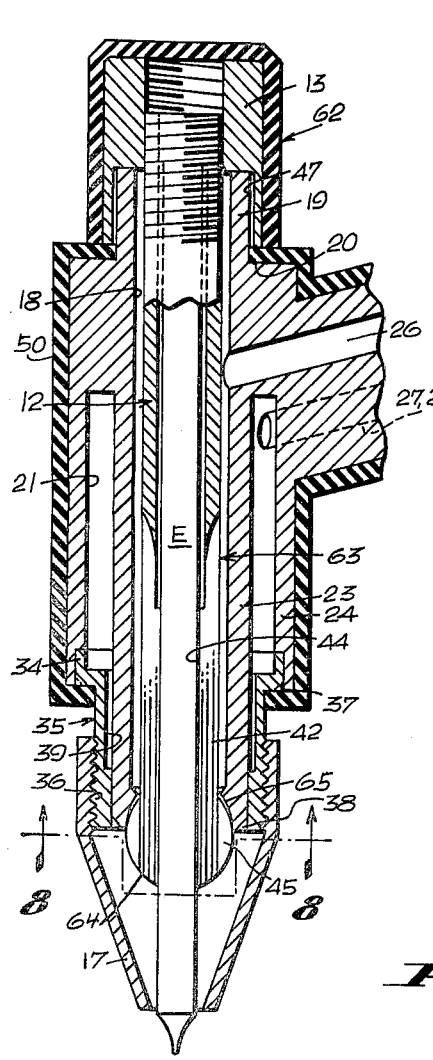
Fig. 6
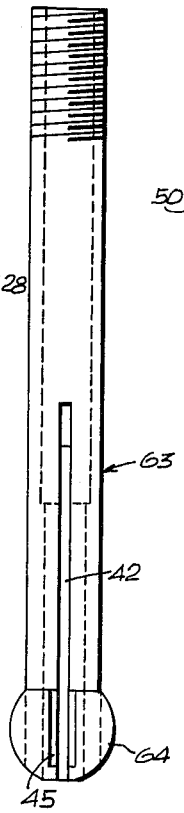
Fig. 7
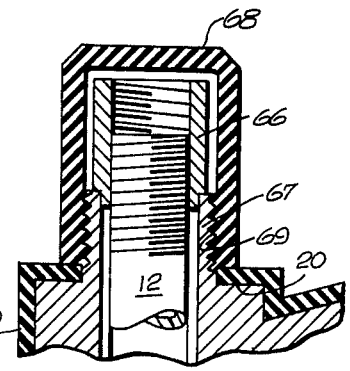
Fig. 9
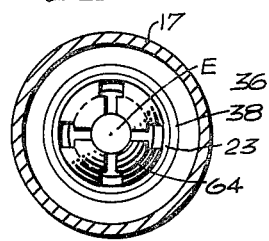
Fig. 10
Fig. 8
INVENTOR.
LOUIS F. HIMMELMAN
BY
ATTORNEY.

United States Patent Office 3,250,889
Patented May 10, 1966

3,250,889
ELECTRIC WELDING TORCH
Louis F. Himmelman, Teaneck, N.J.
(28 Arrowhead Road, Upper Saddle River, N.J.)
Filed May 21, 1964, Ser. No. 369,061
6 Claims. (Cl. 219—75)

My invention relates to electric welding and is directed particularly to improvements in gas shielded electric welding torches for hand use or use in welding machines.

In my Patent No. 2,514,060, issued July 4, 1950, there is disclosed a light-weight welding torch for welding thin sheet metals in an inert gaseous atmosphere. The present invention has for its principal object the improvement of the torch therein disclosed. More specifically, the present invention has among its features of novelty, an improved electrode-supporting and chucking mechanism permitting the use of electrode stubs as well as long pieces, while at the same time improving the gas conductive passageways around the chuck to eliminate any possibility of gas blockage.

Another salient feature of the present invention resides in improvement of the torch water cooling system, particularly with respect to water cooling of the current-supplying cable to the torch, whereby the torch can be comfortably and conveniently handled when welding by hand.

Yet another object of the invention is to provide an improved torch of the character described wherein the gas passageway through the torch and chuck mechanism to the welding electrode tip is so designed as to eliminate any possibility of gas blockage, while at the same time minimizing any possibility of gas leakage at the upper end of the torch.

Yet another object is to provide a torch of the above nature wherein the torch body, including its cooling system, is of unitary construction, and therefore devoid of gaskets and the like sealing devices to eliminate any possibility of leakage.

Yet another object is to provide an improved welding torch of the above nature which will be simple in construction, economical to manufacture, compact, well adapted to seam welding, either by hand or by machine, and which will be foolproof in operation, easy to manipulate and long-wearing in use.

Other objects, features and advantages of the invention will be apparent from the following description when read with reference to the accompanying drawings. In the drawings, wherein like reference numerals denote corresponding parts throughout the several views:

FIG. 1 is a side elevational view of a welding torch embodying the invention, shown partly in section;

FIG. 2 is a fragmentary vertical section of the lower portion of the torch, illustrating constructional details thereof;

FIG. 3 is a horizontal cross-sectional view taken along the line 3—3 of FIG. 2 in the direction of the arrows, illustrating details of the coolant flow system;

FIG. 4 is a horizontal cross-sectional view taken along the line 4—4 of FIG. 2 in the direction of the arrows, illustrating details of the electrical chuck and gas flow mechanism;

FIG. 5 is a horizontal cross-sectional view taken along the lines 5—5 of FIG. 2 and showing details of the chuck jaws;

FIG. 6 illustrates, in vertical cross-section, a modification of the torch shown in FIGS. 1–6;

FIG. 7 is an elevational view of the electrode chuck forming part of the embodiment of FIG. 6;

FIG. 8 is a horizontal cross-sectional view taken along the line 8—8 of FIG. 6 in the direction of the arrows;

FIG. 9 is a fragmentary view illustrating still another modification of the torch; and FIG. 10 is a fragmentary view showing how the electrode chuck of FIG. 7 can be used with the form of torch illustrated in FIG. 1.

Referring now in detail to the drawings, the numeral 10 in FIG. 1 designates the improved electric hand torch embodying the invention, the same being comprised, generally, of a torch body 11, an electrode chuck 12, a chuck adjustment member 13, a cap member 14, a handle 15, a water cooled electrical conduit connector 16 and a nozzle 17. The body 11 of the torch is generally cylindrical in form, and provided with an axial bore 18. The upper end of the body 11 is formed with a reduced-diameter portion 19 defining an annular shoulder 20. The lower end of the body 11 is formed with a deep concentric, annular recess 21 which, as hereinbelow more fully described, provides a chamber for the flow of the water coolant. The lower end of the body 11 is also counterbored to provide an annular recess 22 for the purpose hereinafter appearing. The annular recess 21 of the body 11 defines, with the axial bore, 18, a central tubular portion 23 which extends beyond the tubular outer sleeve portion 24 of said body member.

An arm 25 is integrally formed with the torch body 11 and is bored to provide an upper gas inlet opening 26 which communicates at its inner end with the axial bore 18 of said body, and a pair of side-by-side lower bores 27, 28 which communicate at their inner ends with the annular chamber 21 of said body. The outer end of the arm 25 is externally threaded, as indicated at 29, to receive thereon the internally-threaded inner end of a tubular handle 30. The outer ends of the gas and water passageway bores 26, 27, and 28 are counterbored for receiving soldered therein, flexible metal conduits 31, 32, 33, conducting gas to the torch and for circulating water thereto, as is hereinbelow more fully described.

Coaxially fitted within the annular recess 22 at the lower end of the sleeve portion 24 of the torch body 11 is a thin, cylindrical flange portion 34 at one end of a tubular, outwardly-extending tip member 35, said tip member being externally threaded, as indicated at 36, and coextensive with and embracing the outer end of the tubular portion 23 of said body. The flange portion 34 of the tip member 35 is brazed to the body sleeve portion 24, as indicated at 37, and the outer end of said tip member is brazed to the outer end of the tubular portion 23 of said body, as indicated at 38, whereby the lower end of the annular chamber 21 in said body is sealed off. Preferably, the inner end of the tip member 35 is counterbored, as indicated at 39, to provide an extension of the annular chamber 21 for circulatory flow of the water coolant near the electrode end of the torch.

The electrode chuck 12 is tubular in form and, for the most part, is of such outer diameter as to fit loosely within the axial bore 18 of the body 11. The lower end of the chuck 12 is integrally formed with a short section of gradually increasing outer diameter to provide a frusto-conical tip portion 40. The axial bore 18 is chamfered or beveled at its outer end, as indicated at 41, at an angle substantially equal to the gradient angle of the frusto-conical tip portion 40 of the electrode chuck 12, and said tip portion is normally in face-to-face sliding engagement with respect to said chamfer. The lower end of the tubular chuck 12 is longitudinally slotted at four equidistantly-spaced portions about the periphery thereof, as indicated at 42, to provide resilient, segmental gripping jaws 43, and the internal diameter of said tubular chuck at said lower end is stepped to provide a slightly reduced diameter portion 44 for gripping engagement with electrode rods upon closure of the chuck, as is hereinbelow more fully described. As illustrated in FIGS. 2 and 5, the slots 42, where extruding through the frusto-conical tip portion 40 of the chuck 12, are somewhat widened in the beveled zone, as indicated at 45, to provide paths for gas flow to the outer end of the electrode rod independently of whether or not the slots 42 are severely reduced in size by action of the clutch in gripping small diameter rods in the manner hereinbelow described.

The upper end of the tubular chuck 12 is externally threaded and normally extends upwardly through the reduced-diameter portion 19 at the upper end of the body 11. Means comprising the chuck adjustment member 13 is provided for drawing the electrode chuck 12 upwardly through the axial bore 18 in the body 11 for clutching or gripping a length of electrode rod E in adjusted position therein by wedging action of the resilient gripping jaws 43 in sliding against the beveled outer end of the said bore. To this end, the chuck adjustment member 13 has, at its lower end, an internally-threaded bore 46 threadable on the outer end of the chuck 12, and is counterbored, as indicated at 47, to fit over the reduced-diameter portion 19 at the upper end of the body 11 and bear against the shoulder 20 thereat. The upper end 48 of the adjustment member is of reduced diameter, and serves as a sleeve enclosing the upper end of a length of electrode rod E chucked in the torch, and as such, need only be long enough to accommodate the particular length of electrode rod being used. Thus, if short stub electrodes are being used, the upper end portion 48 of the chuck adjustment member 13 could be very short, or even dispensed with, as is illustrated by the cap member 62 in the embodiment of the invention illustrated in FIG. 6.

The cap member 14, preferably of rubber or neoprene, is removably fitted over the chuck adjustment member 13 after adjustment is completed, and serves to insulate the upper end of the torch and, at the same time, seal off the open end of the chuck adjustment member 13. The outer surface of the torch body 11 is also coated with a layer of synthetic rubber 50 or the like for heat and electrical insulation purposes.

The nozzle 17, threadable on the externally-threaded end 36 of the tip member 35, directs gas flowing through gas conduit 31, axial bore 18, jaw slots 42 and 45, to a narrow annular opening 51 near the arc-forming welding tip, whereby said tip will be encompassed by a stream of gas so that the arc will always be operating in a gas bubble.

Means is also provided for cooling the flexible hollow current conductor 52 electrically connected to the torch body through the water conduit 33 which carries water to cool the outside of the conductor as well as water flowing through the hollow central portion of the current conductor, and thus through the chuck 12 to the electrode rod E. To this end, the flexible hollow current conductor 52 is sleeved in flexible tubing 53, such as vinyl tubing, and has its torch terminal end soldered or otherwise secured in one end 54 of a tubular fitting 55, the other end 56 of which is of increased diameter and tubular, and formed with apertures 57 at its juncture with the end 54 for the passage of the water coolant. A ferrule 58 serves to crimp the end of the tubing 53 in annular recesses 59 formed about the outside of the fitting end 56 and thereby seal it off. The outwardly-projecting end of the fitting 55 is provided with an ordinary screw-on connector fitting 60 receivable on a threaded stud member 61 soldered or otherwise secured to the outer end of the water conduit 33. It will thus be apparent that not only is electrical contact made through the conductor 52 to the torch electrode E, but also said conductor, which carries a heavy current and therefore, because of its limited diameter, must dissipate substantial quantities of heat, is continuously cooled by coolant water flowing to or from the torch body through the water circulating conduits 32 and 33.

The embodiment of the invention illustrated in FIGS. 6, 7 and 8, besides the modification of the cap member 62 as mentioned above, differs from the embodiment of FIGS. 1 through 5 only with respect to the chucking mechanism for the electrode chuck. Thus, the electrode chuck 63 of the modified form has its outer end surfaces of such shape as to define a spherical or ball tip 64 (see FIG. 7). Also, for cooperation with the ball tip 64 of the electrode chuck 63, the outer end of the axial bore 18 of the torch body 11 is formed with a semi-spherical socket 65 adapted to receive said ball tip. The diameter of the semi-spherical socket 65 is slightly less than that of the ball tip 64, to cause clamping action of the electrode chuck when it is drawn upwardly in the body 11 as hereinabove described in connection with the description of operation of the first form of the invention illustrated in FIGS. 1 through 5.

FIG. 10 illustrates how the modified form of chuck electrode 63 as illustrated in FIG. 7 could be used with the torch body 11, of the first form of the invention illustrated in FIGS. 1 and 2. As shown in FIG. 10, the outer rounded surfaces of the ball tip 64 are wedged against the chamfered surface 41 at the outer end of the bore 18, to effect clamping action as the electrode chuck is drawn inwardly as described above.

FIG. 9 illustrates a modification of the invention wherein a chuck-drawing nut 66, which seats against the outer end of the reduced diameter portion 67 of the torch body, is utilized for control of the electrode chucking action, and wherein a separate internally-threaded cap member 68 is receivable on an external thread 69 provided on said reduced diameter portion. Use of the separate screw-on cap member 68 is especially effective in sealing off the upper end of the torch body to prevent any escape of gas. It is also to be noted that the upper end of the cap member 68 could be extended, as is the cap member 14 of FIG. 1, to accommodate the use of long electrodes in the torch.

While I have illustrated and described herein only two forms in which the invention may conveniently be embodied in practice, it is to be understood that these forms are presented by way of example and not in a limiting sense. The invention, in brief, comprises all the embodiments and modifications coming within the scope and spirit of the following claims.

What I claim as new and desire to secure by Letters Patent is:

1. An electric welding torch comprising, in combination, a torch body having an end-to-end bore, an annular chamber within said body and surrounding said bore, one end of said bore being recessed to provide a bore portion of gradually increasing diameter, a tubular chuck member received in said bore and having at one end an enlarged portion the outer surface of which is in face-to-face contact with said recessed portion of said bore, said chuck member having a plurality of circumferentially-spaced longitudinal slots at said one end and defining a plurality of laterally-resilient chuck jaws, means at the other end of said chuck member for drawing said one end thereof inwardly of said bore for actuating said chuck jaws, and means for circulating a coolant through said chamber for cooling said torch body, said slots of said tubular chuck member, where extending through said recessed portion at said one end thereof, being of increased width at radially-outwardly-extending end portions thereof, and means for directing the flow of an inert gas through said torch body bore and through said chuck member slots for enveloping an arc formed at the tip of an electrode secured in said chuch member.

2. An electric welding torch as defined in claim 1 wherein the recess at said one end of said bore is in the form of a semi-spherical seat, and wherein said one end of said tubular chuck member is of semi-spherical shape and of somewhat greater diameter than the diameter of said semi-spherical seat.

3. An electric welding torch as defined in claim 1 wherein said coolant circulating means comprises a handle integrally formed with said torch body and extending outwardly of the side thereof, a pair of passageways extending through said handle and communicating at their inner ends with said annular chamber, and a flexible, non-electrically conductive conduit connected to the other end of one of said pair of passageways and adapted to carry a coolant fluid fed therethrough.

4. An electric welding torch as defined in claim 3 including a hollow flexible electrical conductor carried within said conduit and electrically connected to said torch body through said handle, whereby said conductor will be cooled by coolant flowing through said conduit.

5. An electric welding torch as defined in claim 1 wherein said chuck drawing means comprises a reduced diameter portion at one end of said torch body and defining therewith an annular shoulder, and a chuck adjustment member counter-bored to fit over said reduced diameter portion and seat against said annular shoulder, the other end of said chuck member being externally threaded and said chuck adjustment member being internally threaded and threadable on said other end of said chuck member.

6. An electric welding torch as defined in claim 5, wherein said reduced-diameter portion of said torch body and the counterbore of said chuck adjustment member closely interfit, and including resilient sealing means at the juncture of said chuck adjustment member with said annular shoulder to prevent leakage of gas to the top of said torch body.

References Cited by the Examiner
UNITED STATES PATENTS

| | | | |
|---|---|---|---|
| 2,468,805 | 5/1949 | Herbst | 219—75 |
| 2,532,807 | 12/1950 | Girard et al. | 219—75 |
| 2,784,294 | 3/1957 | Gravert | 219—75 |
| 3,042,791 | 7/1962 | Rieh | 219—75 |

RICHARD M. WOOD, *Primary Examiner.*
ANTHONY BARTIS, *Examiner.*